United States Patent [19]
Aufrere et al.

[11] Patent Number: 5,788,331
[45] Date of Patent: Aug. 4, 1998

[54] PROFILED ARMATURE FOR MOTOR VEHICLE SEAT

[75] Inventors: Christophe Aufrere, Marcoussis; Bruno Hamelin, Combs La Ville, both of France

[73] Assignee: Bertrand Faure Equipements S.A., Boulogne, France

[21] Appl. No.: 915,087

[22] Filed: Aug. 20, 1997

Related U.S. Application Data

[63] Continuation of Ser. No. 648,720, May 16, 1996, abandoned.

[30] Foreign Application Priority Data

May 23, 1995 [FR] France .................. 95 06338

[51] Int. Cl.⁶ .................................................. A47C 7/02
[52] U.S. Cl. ........................... 297/452.18; 297/463.1; 297/362.11
[58] Field of Search .................... 297/452.18, 354.12, 297/463.1, 452.2, 362.1, 362

[56] References Cited

U.S. PATENT DOCUMENTS

| | | | |
|---|---|---|---|
| 3,342,527 | 9/1967 | Bencene | 297/354.12 X |
| 4,322,112 | 3/1982 | Berghaus et al. | 297/354.12 X |
| 4,575,153 | 3/1986 | Aoki et al. | 297/452.2 |
| 4,657,303 | 4/1987 | Croft | 297/354.12 X |
| 4,696,515 | 9/1987 | Heesch | 297/354.12 X |
| 4,705,318 | 11/1987 | Yamada et al. | 297/354.12 X |
| 5,002,339 | 3/1991 | Yamashita et al. | 297/354.12 |
| 5,131,721 | 7/1992 | Okamoto | 297/452.18 |
| 5,340,196 | 8/1994 | Ikegaya et al. | 297/354.12 X |
| 5,412,860 | 5/1995 | Miyauchi et al. | 297/452.2 X |
| 5,529,378 | 6/1996 | Chaban et al. | 297/483.1 X |
| 5,690,386 | 11/1997 | Chabanne | 297/452.2 X |

FOREIGN PATENT DOCUMENTS

| | | |
|---|---|---|
| 0 372 339 | 6/1990 | European Pat. Off. . |
| 2424146 | 11/1979 | France . |
| 2 203 463 | 8/1973 | Germany . |
| 39 16 698 | 11/1990 | Germany . |
| 41 42 789 | 2/1993 | Germany . |
| 457229 | 11/1936 | United Kingdom . |
| 2110294 | 6/1983 | United Kingdom ............ 297/354.12 |

*Primary Examiner*—Peter R. Brown
*Assistant Examiner*—Stephen Vu
*Attorney, Agent, or Firm*—Pollock, Vande Sande & Priddy

[57] ABSTRACT

An armature assembly is provided for a vehicle seat. The assembly includes an armature having a central web extending in a plane substantially orthogonal to the transverse direction of the vehicle seat. A first flange extends from a first edge of the central web that is situated towards the outside of the seat, the first flange extending in a first direction toward an opposite side member. A second flange extends from a second edge of the central web that is situated towards the inside of the seat, the second flange being directed toward a second direction, opposite the first.

5 Claims, 2 Drawing Sheets

PROFILED ARMATURE FOR MOTOR VEHICLE SEAT

This application is a continuation of U.S. patent application Ser. No. 08/648,720, filed May 16, 1996 now abandoned.

FIELD OF THE INVENTION

The present invention relates to a seat, especially motor vehicle seat, armature.

BACKGROUND OF THE INVENTION

Known armatures for these seats are formed of a tubular structure in the overall shape of a U, for example a bent tube. Other armatures are formed, at least for the lateral parts of the armature, from pressed sheet or alternatively from section pieces having a U- or C-shaped cross section obtained, for example, by casting metal alloys.

The use of section pieces of this type, in which the U or C section is open towards the inside of the armature, has several drawbacks:

- at the articulated link between the armature of the seat part and that of the backrest, the articulation mechanism and the mechanism for adjusting the inclination of the backrest are placed in the hollow of the section piece, and fitting them may therefore be awkward;
- in the region where the user's back rests, the flange of the section piece turned back towards the inside generates a certain bulk which leads either to the width of the backrest being reduced, which detracts from the user's level of comfort, or, in order to avoid this first drawback, to the armature being widened, which then leads to the widthwise external bulk of the seat being increased.

The object of the present invention is to solve these problems and the present invention in addition aims to make the manufacture of section pieces intended for the construction of armatures easier.

With these objectives in mind, the subject of the invention is a seat armature including two profiled lateral cheeks constituting the sides of the armature, characterized in that the said section pieces have a Z-shaped overall cross section including:

- a central web stretching substantially in a plane orthogonal to the transverse direction of the seat,
- a first flange stretching towards the inside of the armature starting from the edge of the said web situated towards the outside of the seat,
- a second flange stretching towards the outside of the armature starting from the edge of the web situated towards the inside of the seat.

It is specified that the words "inside of the seat" denote the user space i.e., "inside" refers to the "front" side in the case of a backrest, and to the "top side" in the case of the seating part; "outside" refers to the "rear side" of the backrest, and to the "bottom side" of the seating part. Thus, when the armature is a backrest armature, the first flange is situated towards the rear of the backrest and the second flange is situated towards the front; when the armature is a seat part armature, the first flange is situated towards the underside of the seat part and the second flange is situated towards the top face.

The armature according to the invention makes it possible to optimize the weight/strength ratio of the armature, giving the lateral cheeks of the armature a great deal of stability, that is to say a high bending strength while allowing a saving in bulk owing to the fact that the second flange directed towards the outside gives, for a given position of the web, more widthwise space for the user while the first flange directed towards the inside of the armature makes it possible to reduce the external bulk of the seat, towards the outside thereof. Alternatively, for a given working width, the webs of the two flanges may be brought closer together, relative to armatures of the prior art using section pieces of U-shaped cross section, this making it possible to save on external bulk of the seat.

The mechanisms for articulation between seat part and backrest may hence be placed, for example, on the outer side of the web of the cheek of the backrest armature without increasing the external bulk of the seat. What is more, mechanisms for controlling the inclination of the backrest may be placed without difficulty on the inner side of the armature whereas in the aforementioned prior art, the front flange of the U section constitutes a hindrance to the fitting of such mechanisms.

As a preference, the said first flange includes on its edge distant from the web a return directed towards the inside of the seat, which increases the rigidity of this flange and therefore that of the section piece.

To the same end, the second flange may also include a second return preferably directed towards the outside of the section piece, that is to say forwards in the case of a backrest armature or upwards for a seat part armature.

Other features and advantages will emerge in the description which will be given by way of example of a backrest armature in accordance with the invention.

Reference will be made to the attached drawings in which:

DETAILED DESCRIPTION OF THE INVENTION

Figure 1:
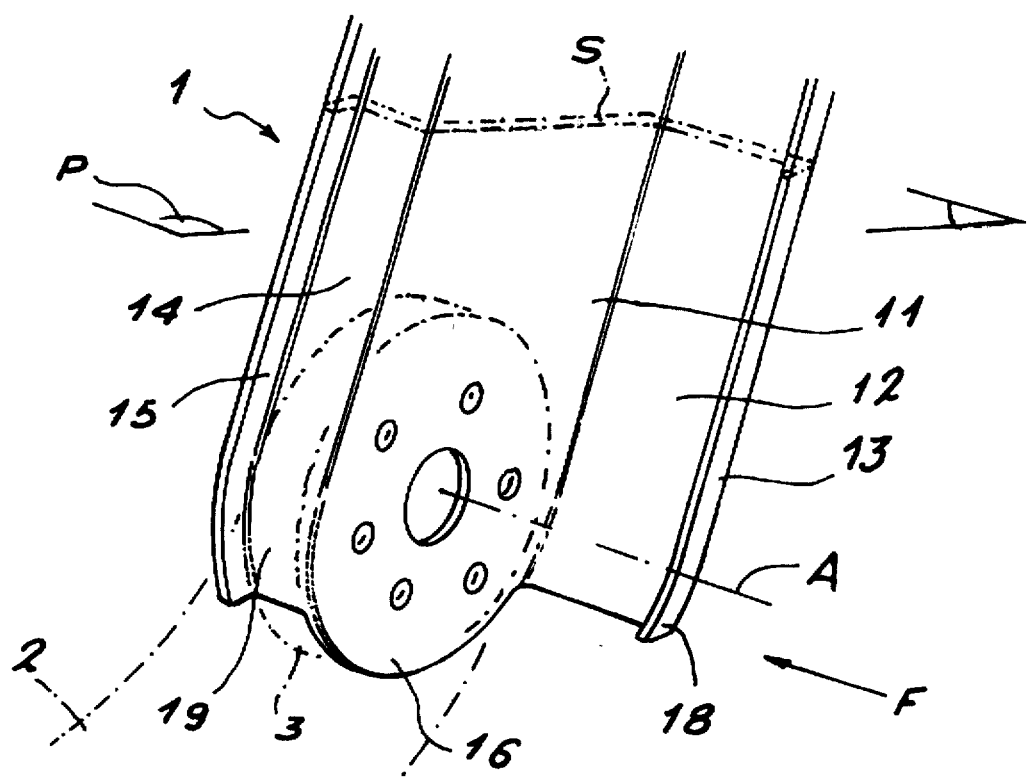
FIG. 1 is a partial view in perspective of such an armature, in which only the region of articulation to the seat part armature is represented.

The drawing of FIG. 1 represents the lower end of a cheek 1 of a backrest armature articulated to the armature 2 of the seat part by means of an articulation mechanism 3 of a type known per se. The cheek 1 is formed of a section piece whose cross section S, represented in chain line in the figure, has the overall shape of a Z and which includes:

- a web 11 stretching in a plane orthogonal to the transverse direction of the seat, which corresponds to the direction of the articulation axis A;
- a rear flange 12 stretching from the rear edge of the web substantially perpendicular thereto in the direction of the cheek, not represented, situated on the other side of the backrest;
- a flange return 13 stretching from the said rear flange towards the front of the seat, substantially parallel to the web;
- a front flange 14 stretching from the front edge of the web perpendicular thereto towards the outside of the seat, that is to say in the opposite direction to the rear flange; and a front flange return 15 which stretches forwards from the edge of the said front flange.

Figure 2:
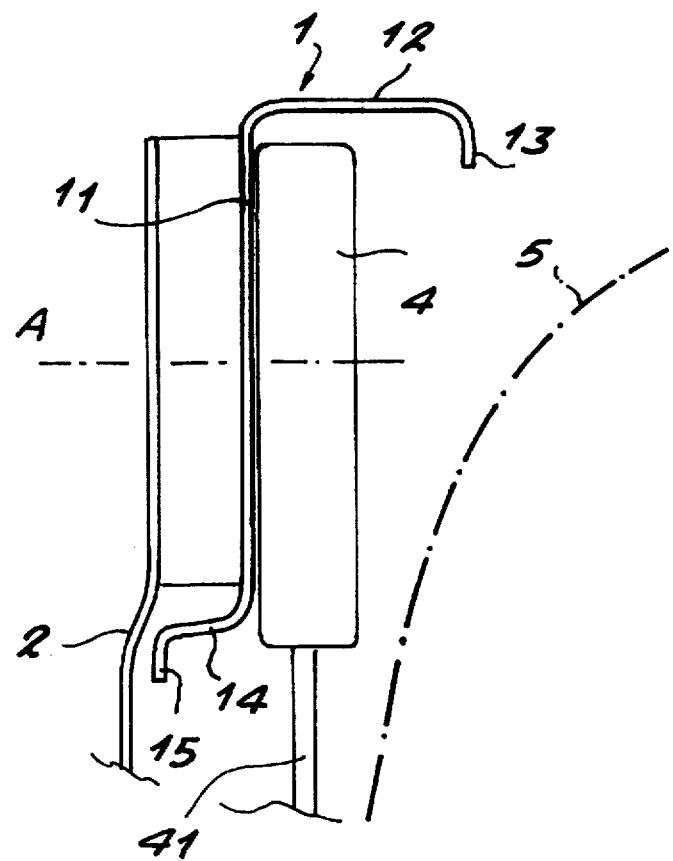
FIG. 2 is a diagrammatic view in section on the plane P of FIG. 1.

The specific shape of the cross section of the section piece in accordance with the invention is clearly visible in the drawing of FIG. 2. This figure also represents the outline 5 of the seat part surface area available to the user, commonly denoted by the expression "seat comfort space", which makes it possible to observe that the front flange 14 oriented towards the outside of the armature (towards the left-hand side in FIG. 2) allows a significant space to be kept between the said outline and the cheek despite the curved shape of the said outline. It will also be observed that the rear flange 12, which is greatly offset backwards with respect to the said outline, may therefore have a relatively large width and therefore give the section piece great rigidity.

Figure 3:
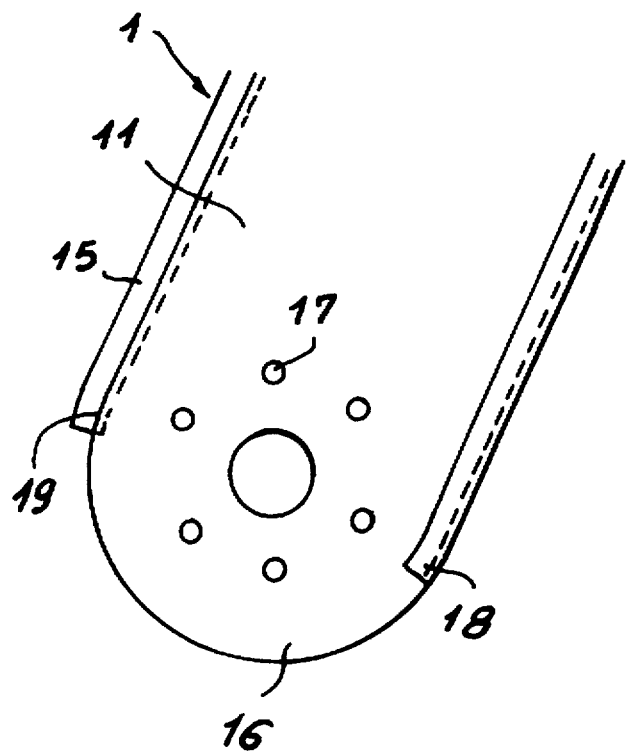
FIG. 3 is a lateral view in the direction of the arrow F of FIG. 1 of the section piece used.

As can be clearly seen in the drawing of FIG. 3, the lower end of the web is shaped into a rounded part 16 corresponding substantially to the external bulk of the articulation mechanism 3. This mechanism is fitted on the external face of the web 11 between the latter and the seat part armature cheek 2 and fixed to the said web by screwing (only the screw holes 17 pierced in the web have been represented). The space between the web 11 and the seat comfort space allows a reduction gear 4 of an electric backrest inclination control mechanism to be housed easily on the other side of the web, for example. It will be noted that the control element 41 (shaft or flexible shaft) of this reduction gear can stretch forwards without any need for a specific cutout in the section piece, because the front flange 14 is directed towards the outside of the seat.

Moreover, the two flanges 12, 14 of the cheek extend downwards below the level of the axis A, their lower ends 18, 19 matching the curvature of the web 11, as represented in FIG. 3, this making it possible to stiffen the armature as much as possible at the articulation without increasing the bulk of the lower end of the flanges when the backrest is inclined, especially forwards.

Figure 4:
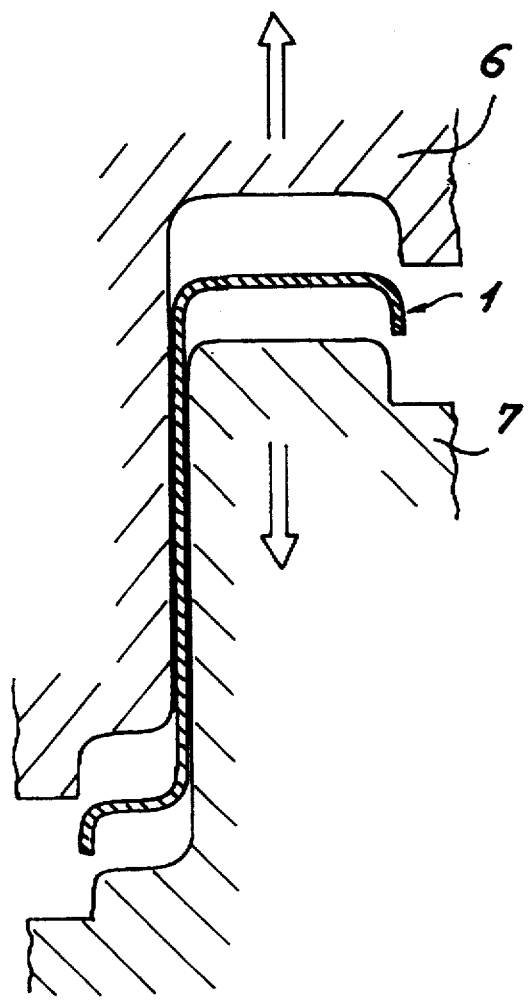
FIG. 4 illustrates the step of releasing the section piece according to the invention from the mould in the case of a manufacturing method employing casting.

The armature section piece according to the invention may, in particular, be manufactured by casting. Represented in transverse section in the drawing of FIG. 4 is the section piece 1 and the two halves 6, 7 of the mould used, during the phase of releasing from the mould.

As will readily be understood in the light of this figure, an additional advantage of the shape of the armature section piece according to the invention results from the simplification of the casting tools, the Z-shaped cross section of the section piece allowing the mould elements to be limited merely to the mould halves represented, without any auxiliary mould element. Indeed, mould release takes place simply by parting the mould halves in the direction of the arrows in FIG. 4.

We claim:

1. An armature assembly forming internal frames of mating backrest and bottom seat sections, the assembly comprising:
   a first armature for the backrest section having a front and back, and further including
      a) at least one transverse member; and
      b) two parallel spaced lateral members, of generally Z-shaped cross section connected to the transverse member and forming sides of the armature, each said lateral member including
         i) a central web extending in a plane orthogonal to the transverse member and having exposed unreinforced opposite surfaces along the entire length thereof;
         ii) a first flange integrally upstanding from a first elongated edge of the web, in proximity to the back of the backrest section, and extending in a direction toward the inside of the armature;
         iii) a second flange integrally upstanding from a second elongated edge of the web, in proximity to the front of the backrest section, and extending in a direction toward the outside of the armature;
   a second armature for the bottom seat section and having
      c) at least one transverse member; and
      d) two parallel spaced lateral members connected to the corresponding transverse member and forming sides of the second armature; and
   a pivoting articulation mounted between an exposed surface of the web of the first armature lateral member and a confronting overlying surface of the second armature lateral member thereby producing a minimized thickness in the area of the articulation.

2. The apparatus set forth in claim 1 wherein the second armature lateral members of the bottom seat section further comprises:
   a generally Z-shaped cross section, and further wherein each said lateral member includes
      a) a central web extending in a plane orthogonal to the transverse member of the second armature member and having exposed unreinforced opposite surfaces along the entire length thereof;
      b) a first flange integrally upstanding from a first elongated edge of the web in proximity to the bottom of the bottom seat section and extending in a direction toward the inside of the armature; and
      c) a second flange integrally upstanding from a second elongated edge of the web in proximity to the top of the bottom seat section and extending in a direction toward the outside of the armature.

3. The armature assembly set forth in claim 1 wherein the first and second flanges of said lateral members each have flange returns extending from outer edges thereof, the returns positioned in parallel spaced relation to said respective web; and more particularly wherein:
   the returns of the first and second flanges of the backrest section extend in a forward direction.

4. An armature assembly forming internal frames of mating backrest and bottom seat sections, the assembly comprising:
   a first armature for the bottom seat section and having
      a) at least one transverse member; and
      b) two parallel spaced lateral members, of generally Z-shaped cross section connected to the transverse member and forming sides of the armature,
   each said lateral member including
      i) a central web extending in a plane orthogonal to the transverse member and having exposed unreinforced opposite surfaces along the entire length thereof;
      ii) a first flange integrally upstanding from a first elongated edge of the web, in proximity to the bottom of the bottom seat section, and extending in a direction toward the inside of the armature;
      iii) a second flange integrally upstanding from a second elongated edge of the web, in proximity to the top of the bottom seat section, and extending in a direction toward the outside of the armature;
   a second armature for the seat backrest section and having
      c) at least one transverse member; and
      d) two parallel spaced lateral members connected to the corresponding transverse member and forming sides of the second armature; and
   a pivoting articulation mounted between an exposed surface of the web of the first armature lateral member and a confronting overlying surface of the second armature lateral member thereby producing a minimized thickness in the area of the articulation.

5. The armature assembly set forth in claim 4 wherein the first and second flanges of said lateral members each have flange returns extending from outer edges thereof, the returns positioned in parallel spaced relation to said respective web; and more particularly wherein:

the returns of the first and second flanges of the bottom seat section extend in an upward direction.

* * * * *